(12) United States Patent
Posselt

(10) Patent No.: US 6,698,189 B1
(45) Date of Patent: Mar. 2, 2004

(54) METHOD FOR OPERATION OF AN INTERNAL COMBUSTION ENGINE

(75) Inventor: Andreas Posselt, Mühlacker (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,539

(22) PCT Filed: Jun. 16, 2000

(86) PCT No.: PCT/DE00/02006

§ 371 (c)(1), (2), (4) Date: Jan. 31, 2002

(87) PCT Pub. No.: WO01/09490

PCT Pub. Date: Feb. 8, 2001

(30) Foreign Application Priority Data

Jul. 31, 1999 (DE) .......................................... 199 36 200

(51) Int. Cl.[7] ................................................. F01N 3/00
(52) U.S. Cl. ............................. 60/285; 60/274; 60/276
(58) Field of Search .......................... 60/274, 276, 285, 60/297, 301, 278

(56) References Cited

U.S. PATENT DOCUMENTS 5,771,685 A  6/1998  Hepburn
5,970,707 A * 10/1999  Sawada et al. ................ 60/277
6,116,023 A *  9/2000  Ishizuka et al. ............... 60/301
6,119,447 A *  9/2000  Eriksson et al. ............... 60/274
6,205,773 B1 *  3/2001  Suzuki .......................... 60/276
6,336,320 B1 *  1/2002  Tanaka et al. ................. 60/285
6,357,224 B1 *  3/2002  Kawamoto et al. ........... 60/277

FOREIGN PATENT DOCUMENTS

EP  0690213  1/1996
EP  0903479  3/1999

* cited by examiner

Primary Examiner—Binh Tran
(74) Attorney, Agent, or Firm—Walter Ottesen

(57) ABSTRACT

An internal combustion engine (1), especially of a motor vehicle, is described, which has a combustion chamber (4) into which fuel can be injected in a rich operating mode and in a lean operating mode. The internal combustion engine (1) is provided with a catalytic converter (12) in which nitrogen oxides can be stored as well as with a lambda sensor (22) mounted after the catalytic converter (12). The lambda of the exhaust gas can be measured with the lambda sensor. A control apparatus (18) is provided for switching over between the rich operating mode and the lean operating mode. With the control apparatus (18), a first time span is measured after a switchover of the internal combustion engine (1) into the lean operating mode. This first time span elapses until the measured lambda is lean.

8 Claims, 2 Drawing Sheets

METHOD FOR OPERATION OF AN INTERNAL COMBUSTION ENGINE

FIELD OF THE INVENTION

The invention relates to a method for operating an internal combustion engine, especially of a motor vehicle, wherein fuel is injected into a combustion chamber in a rich operating mode and in a lean operating mode. In the method, a switchover takes place between the rich and the lean operating modes and nitrogen oxides are stored in a catalytic converter. The invention likewise relates to a corresponding internal combustion engine as well as to a control apparatus for an engine of this kind.

BACKGROUND OF THE INVENTION

A method of this kind, an internal combustion engine of this kind and a control apparatus of this kind are, for example, known from a so-called gasoline direct injection. There, fuel is injected into the combustion chamber of the engine in a rich operating mode, for example, in a homogeneous operation during the induction phase or in a lean operating mode, for example, in a stratified charge operation during the compression phase. The homogeneous operation is preferably provided for the full-load operation of the engine while the stratified operation is suitable for idle operation and part-load operation. A switchover takes place between the above-mentioned operating modes in such a direct injecting engine, for example, in dependence upon a wanted desired operating mode.

Especially in the lean stratified operation, NOx components (that is, nitrogen oxides) are present in the exhaust gas which cannot be after-treated by a three-way catalytic converter. For this purpose, a storage catalytic converter is provided which stores nitrogen oxides in order to release the same in a subsequent rich operating mode of the engine. The storage catalytic converter must be continuously charged and discharged because the storage capability thereof is limited. This can, for example, be controlled (open loop and/or closed loop) with the aid of a lambda sensor ahead of the catalytic converter so that the storage capability of the storage catalytic converter is modeled.

Defects can occur in the lambda probe and/or in the modeling. These defects can lead to a permanently defective control (open loop and/or closed loop) of the charging and discharging of the storage catalytic converter.

SUMMARY OF THE INVENTION

It is the object of the invention to provide a method for operating an internal combustion engine with which the charging and discharging of the catalytic converter is correctly controlled (open loop and/or closed loop) also over a long time span.

This object is solved in a method of the above-mentioned type in accordance with the invention in that the lambda of the exhaust gas is measured after the catalytic converter and that a first time span is measured after a switchover of the engine into the lean operating mode with this time span elapsing until the measured lambda is lean. In an internal combustion engine and a control apparatus of the above-mentioned type, the object is solved in correspondence to the invention.

Accordingly, a second lambda probe is arranged downstream of the catalytic converter and the lambda of the exhaust gas is measured therewith. If the control apparatus switches the engine into the lean operating mode, then that time span is measured thereafter which elapses until the lambda, which is measured by the second lambda sensor, becomes lean. This time span is a quantity which characterizes the operating state of the storage catalytic converter.

A value can be determined and pregiven, for example, by the manufacturer of the catalytic converter, which defines the limit of a correct operating state of the storage catalytic converter. The measured time span can then be compared by the control apparatus to this limit. If the limit is not exceeded, then the catalytic converter operates in a correct manner. However, if the limit is exceeded, this means that the storage catalytic converter is or works no longer in a permissible operating state. In this case, the control of the engine (open loop and/or closed loop) can be so influenced by the control apparatus that a correct operation of the storage catalytic converter is again attained.

In this way, it is possible to ensure the correct charging and discharging of the storage catalytic converter also for the long term with the aid of the second lambda sensor and a corresponding operation of the engine.

In an advantageous further embodiment of the invention, after a switchover of the engine into the lean operating mode, a second time span is measured in which the engine is operated lean. The first time span and the second time span are then coupled. Preferably, a value is determined which defines the ratio of the first time span to a third time span. The sum of the first time span and the third time span yields the second time span. In this way, it is possible in an especially simple but precise manner to obtain a reliable statement as to the operating state of the storage catalytic converter.

In a further advantageous embodiment of the invention, the control (open loop and/or closed loop) of the engine is influenced if the first time span or a value dependent thereon exceeds a pregiven value. The pregiven value characterizes the maximum permissible operating state of the storage catalytic converter which may not be exceeded.

It is especially advantageous when the time span, in which the engine is driven rich, is extended and/or when the time span wherein the engine is driven lean is shortened. This defines reactions of the control apparatus to the maximum permissible operating state of the storage catalytic converter being exceeded.

As a further advantage, it is possible that the influencing of the engine intervenes adaptively in the control (open loop and/or closed loop). In this way, the model of charging and discharging the storage catalytic converter can also be adapted to long-term changes thereof.

Of special significance is the realization of the method of the invention in the form of a control element which is provided for a control apparatus of an engine, especially of a motor vehicle. A program is stored on the control element which is capable of being run on a computer, especially on a microprocessor, and this program is suitable for executing the method according to the invention. In this case, the invention is realized by a program stored on the control element so that this control element, which is provided with the program, defines the invention in the same way as the method which the program can carry out. Especially an electric storage medium can be used as a control element, for example, a read-only-memory or a flash memory.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
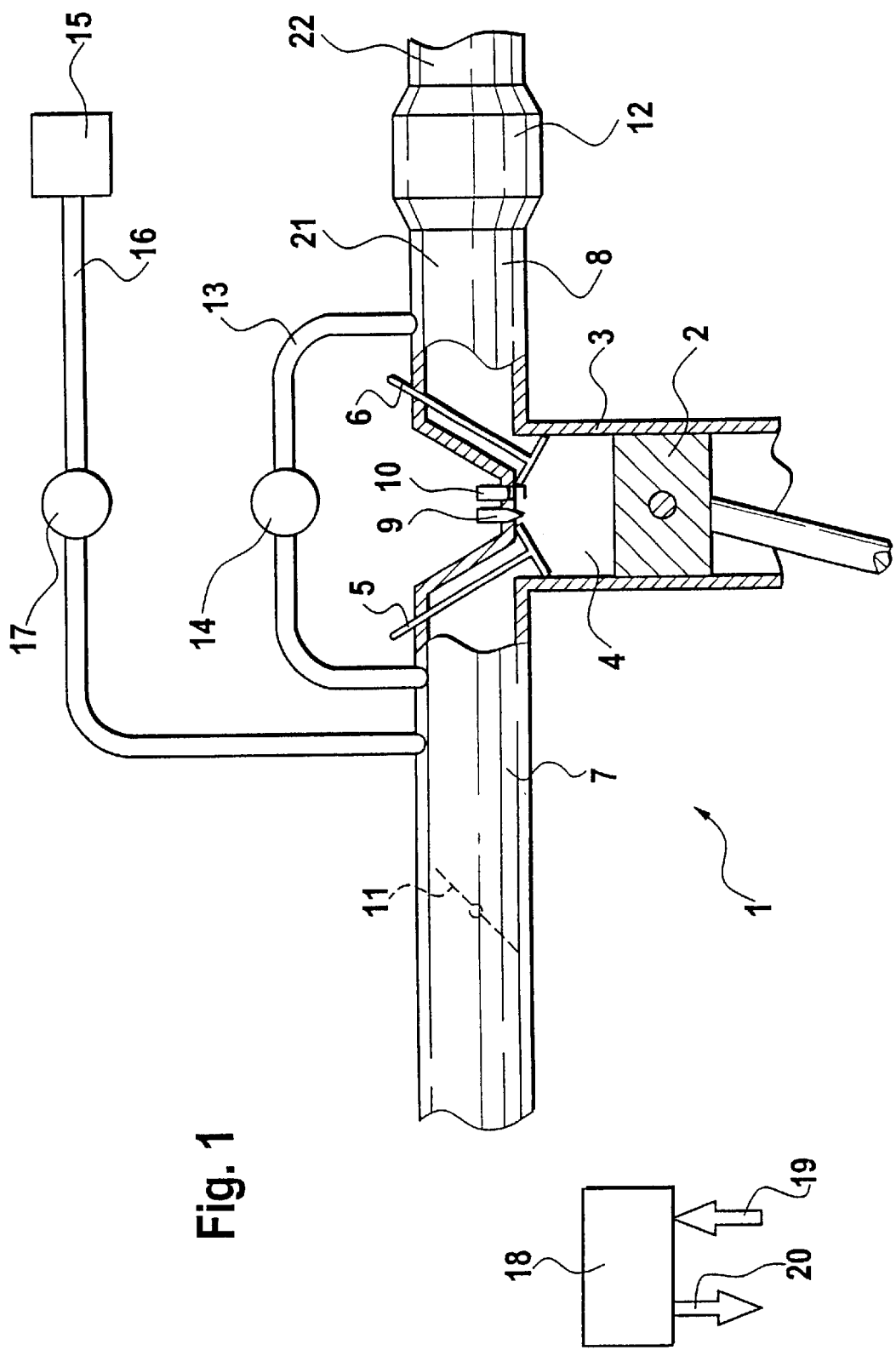
FIG. 1 is a schematic block circuit diagram of an embodiment of an internal combustion engine according to the invention; and, FIG. 2 shows a schematic time diagram for an embodiment of a method of the invention for operating the internal combustion engine of FIG. 1.

In FIG. 1, an internal combustion engine 1 of a motor vehicle is shown wherein a piston 2 is movable back and forth in a cylinder 3. The cylinder 3 is provided with a combustion chamber 4 which is, inter alia, delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10.

A rotatable throttle flap 11 is mounted in the intake manifold 7 and air can be supplied via the throttle flap to the intake manifold 7. The quantity of the supplied air is dependent upon the angular position of the throttle flap 11. A catalytic converter 12 is accommodated in the exhaust-gas pipe 8 and this catalytic converter serves to purify the exhaust gases arising because of the combustion of the fuel.

An exhaust-gas recirculation pipe 13 leads from the exhaust-gas pipe 8 back to the intake manifold 7. An exhaust-gas recirculation valve 14 is accommodated in the exhaust-gas recirculation pipe 13. With this valve 14, the quantity of the exhaust gas, which is recirculated into the intake manifold 7, can be adjusted. The exhaust-gas recirculation pipe 13 and the exhaust-gas recirculation valve 14 define a so-called exhaust-gas recirculation.

A tank-venting line 16 leads from a fuel tank 15 to the intake manifold 7. A tank-venting valve 17 is mounted in the tank-venting line 16 and, with this valve 17, the quantity of the fuel vapor from the fuel tank 15, which is supplied to the intake manifold 7, can be adjusted. The tank-venting line 16 and the tank-venting valve 17 define a so-called tank venting.

The piston 2 is displaced by the combustion of the fuel in the combustion chamber 4 into a back and forth movement which is transmitted to a crankshaft (not shown) and applies a torque thereto.

Input signals 19 are applied to a control apparatus 18 and these signals define measured operating variables of the engine 1. For example, the control apparatus 18 is connected to an air-mass sensor, a lambda sensor, an rpm sensor and the like. Furthermore, the control apparatus 18 is connected to an accelerator pedal sensor which generates a signal which indicates the position of an accelerator pedal, which can be actuated by the driver, and therefore indicates the requested torque. The control apparatus 18 generates output signals 20 with which the performance of the engine 1 can be influenced via actuators or positioning devices. For example, the control apparatus 18 is connected to the injection valve 9, the spark plug 10 and the throttle flap 11 and the like and generates the signals required to drive the same.

The control apparatus 18 is, inter alia, provided to control (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a low fuel consumption and/or a low development of toxic substances. For this purpose, the control apparatus 18 is provided with a microprocessor on which a program is stored in a memory medium, especially in a flash memory, and this program is suited to execute the above-mentioned control (open loop and/or closed loop).

The internal combustion engine 1 of FIG. 1 can be operated in a plurality of operating modes. Accordingly, it is possible to operate the engine 1 in a homogeneous operation, a stratified operation, a homogeneous lean operation and the like. A back and forth switching or switchover can be made between the above-mentioned operating modes of the internal combustion engine 1.

In the homogeneous operation, the fuel is injected by the injection valve 9 directly into the combustion chamber 4 of the engine 1 during the induction phase. The fuel is thereby substantially swirled up to the ignition so that an essentially homogeneous air/fuel mixture arises in the combustion chamber 4. The torque to be generated is adjusted by the control apparatus 18 essentially via the position of the throttle flap 11. In the homogeneous operation, the operating variables of the engine 1 are so controlled (open loop and/or closed loop) that lambda is equal to 1. The homogeneous operation is especially used at full load.

In the stratified operation, the fuel is injected by the injection valve 9 directly into the combustion chamber 4 of the engine 1 during the compression phase. In this way, no homogeneous mixture is present in the combustion chamber 4 when the spark plug 10 is ignited; instead, a fuel stratification is present. The throttle flap 11 can be completely opened except for requests, for example, of the exhaust-gas recirculation and/or of the tank venting and the engine 1 can thereby be operated dethrottled. The torque to be generated is, in stratified operation, substantially adjusted via the fuel mass. With the stratified operation, the engine 1 can be operated especially at idle and at part load.

The catalytic converter 12 is a combination of a three-way catalytic converter and a storage catalytic converter. With the three-way catalytic converter, the toxic constituents of the exhaust gas are continuously after-treated or converted independently of the operating mode. The three-way catalytic converter is, however, not capable of processing the NOx components of the exhaust gas which arise in the stratified operation. For this purpose, the storage catalytic converter is provided.

The storage catalytic converter bonds the NOx components of the exhaust gas in the lean operation of the engine 1, that is, for an oxygen excess, for example, especially during stratified operation. If the engine 1 is thereafter operated with a fuel excess (that is, operated rich), then the storage catalytic converter again releases the bonded NOx components so that these components can be reduced by the three-way catalytic converter and thereby after-treated.

The storage capacity of the storage catalytic converter is not unlimited. For this reason, the still available storage capacity of the storage catalytic converter is determined by the control apparatus 18, for example, with the aid of a model. As soon as the storage capacity is exhausted because of a longer charging of the storage catalytic converter, the engine 1 is switched over into a rich operating mode by the control apparatus 18 so that the storage catalytic converter is again discharged and thereby the storage capacity is again increased. As soon as the storage catalytic converter is discharged, a switchover can again be made by the control apparatus 18 so that the storage catalytic converter can again be charged.

A lambda sensor 21 is provided ahead of the catalytic converter 12 and this lambda sensor is coupled to the control apparatus 18 and is provided to control (open loop and/or closed loop) the above charging and discharging of the storage catalytic converter.

A further lambda sensor 22 is provided after the catalytic converter 12 and this sensor likewise is coupled to the control apparatus.

Figure 2:
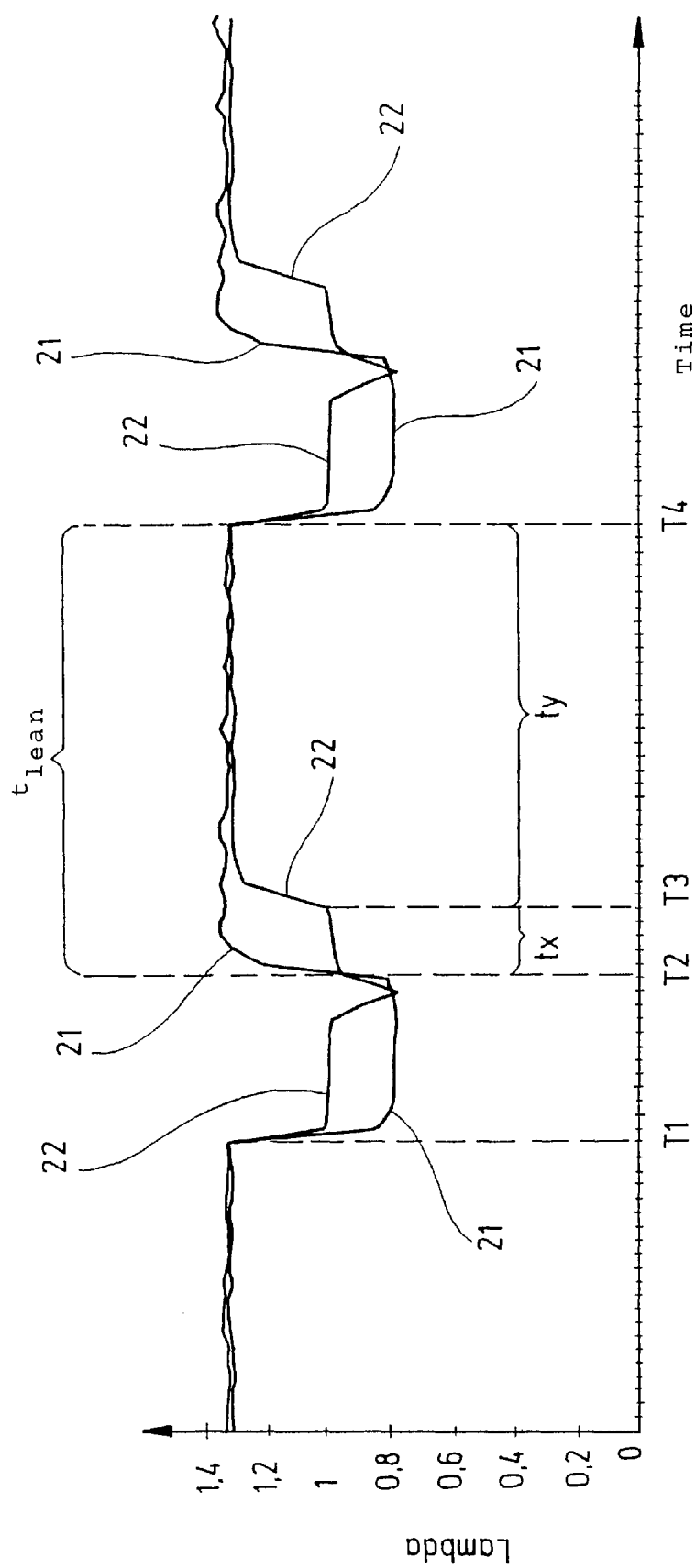

In FIG. 2, the output signals of the lambda sensors 21 and 22 are plotted as a function of time. For simplification, the particular output signals are identified hereinafter with the same reference numerals as the lambda sensors 21, 22.

The output signal 21 of the lambda sensor 21, which is mounted forward of the catalytic converter 12, lies either at a lean value of, for example, approximately lambda=1.3 or at a rich value of, for example, approximately lambda=0.8. The output signal 21 jumps back and forth between these two values. The output signal 21 is at the lean value when the engine 1, for example, is operated in stratified operation.

The time span in which the output signal 21 is at the lean value is characterized in FIG. 2 by tlean.

The output signal 22 of the lambda sensor 22, which is arranged downstream of the catalytic converter 12, lies either at a lean value of approximately lambda=1.3 or at an approximately stoichiometric value of approximately lambda=1. In the stoichiometric region of the output signal 22, a sudden drop or breakthrough can be present, which changes the output signal 22 for a short time to a rich value of, for example, approximately 0.8. However, the output signal 22 essentially jumps back and forth between the lean value and the stoichiometric value.

It is assumed that the engine 1 is in a lean operating mode, for example, in the stratified operation and the storage catalytic converter is thereby charged with NOx components of the exhaust gas and therefore with nitrogen oxides. It is further assumed that the storage catalytic converter reaches its maximum storage capacity at time point T1 that is, it is fully charged.

Then, at time point T1 of FIG. 2, there is a switch out of the lean operating mode of the engine 1 into a rich operating mode, that is, into the homogeneous operation wherein the engine 1 is, for example, accelerated. Thus, at time point T1 the output signals 21 and 22 go over from the lean value to the rich value, that is, to the stoichiometric value.

The difference between the output signal 21 and the output signal 22 results from the situation that the storage catalytic converter releases nitrogen oxides after the switchover, for example, into the homogeneous operation. During this discharge of the storage catalytic converter, a stoichiometric value of the output signal 22 arises at the output of the catalytic converter 12, that is, at the lambda sensor 22.

When the storage catalytic converter is completely discharged, then the rich operating mode breaks through up to the lambda sensor 22 at the output of the catalytic converter 12 and this has the consequence of the breakthrough of the output signal 22 after rich values. Then, the control apparatus 18 switches back again into a lean operating mode, for example, into the stratified operation, at time point T2.

Because of this switchover, the output signal 21 jumps back again to the lean value. The output signal 22, however, still remains at the stoichiometric value up to a time point T3. The time span from the time point T2 to the time point T3 is identified in FIG. 2 by tx.

During the time span tx, the storage catalytic converter is in the position to also take up oxygen and to store the same in addition to charging with NOx components of the exhaust gas. However, as soon as the storage catalytic converter can no longer store any more oxygen, this has the consequence of an oxygen excess at lambda sensor 22 and therefore a lambda output signal 22 having a lean value.

Only at time point T3, does the output signal 22 also jump to the lean value. These lean values of the output signals 21 and 22 are maintained until the storage catalytic converter is again completely charged with NOx components of the exhaust gas, that is, with nitrogen oxides. Then, at time point T4, there is again a switchover into a rich operating mode in order to initiate the discharge of the storage catalytic converter. The time point T4 corresponds to the time point T1.

The time span from the time point T3 to the time point T4, at which the output signal 22 is at approximately a lean value, is identified in FIG. 2 by ty.

The time span tlean is composed of the time spans tx and ty as follows: tlean=tx+ty.

The time spans tx and ty are measured by the control apparatus 18.

Then, a value W is determined by the control apparatus 18 as follows:

$$W=(tx+ty)/tx.$$

This value W defines a quantity for the operating state of the storage catalytic converter. With measurements, for example, of the manufacturer of the storage catalytic converter, it is possible to provide a maximum value Wmax which characterizes an operating condition of the storage catalytic converter which may not be exceeded during operation.

The control apparatus 18 compares the determined value W to the pregiven value Wmax. It is possible to first form a mean value from several sequentially determined values W which is then compared to the value Wmax.

If the value W is less than the value Wmax, this means that the storage catalytic converter is in a permissible operating condition. However, if the value W is greater than the value Wmax, then this can mean two things.

On the one hand, it is possible that the time span from the time point T1 to the time point T2, that is, the time span during which the storage catalytic converter has been discharged, was too short. This has the consequence that a residual of nitrogen oxides remains in the storage catalytic converter and, in this way, the storage capacity of the storage catalytic converter is reduced which, in turn, has the consequence of an increase of the value W. If the value Wmax is exceeded, then this defines a minimum storage capacity of the storage catalytic converter.

As a reaction, the control apparatus 18 subsequently increases the time span from the time point T1 to the time point T2, that is, the time span of the rich operation of the engine 1. In this way, the storage catalytic converter is discharged to a greater degree and therefore the storage capacity of the storage catalytic converter is again increased.

This lengthening of the rich operating mode of the engine 1 can be undertaken adaptively in the context of modeling the charging and discharging of the storage catalytic converter by the control apparatus 18.

On the other hand, it is possible that a so-called low storage has taken place in the storage catalytic converter. This means that the nitrogen oxides and/or the oxygen have not only deposited on the surface of the storage catalytic converter but that these nitrogen oxides and the oxygen have penetrated into the material of the storage catalytic converter. A deep storage of this kind can, for example, take place when the time span in which the storage catalytic converter is charged is too long.

As a reaction, the control apparatus 18 can immediately once again switch over into the rich operating mode of the engine 1 before the storage catalytic converter is again charged. This renewed rich operating mode leads to the situation that the deep storage of the nitrogen oxides and/or of the oxygen in the storage catalytic converter is released and the storage catalytic converter is completely discharged.

As a further reaction, the control apparatus 18 can then reduce the time span in which the storage catalytic converter is charged. This can be undertaken adaptively in the context of the modeling of the charging and discharging of the storage catalytic converter by the control apparatus 18.

What is claimed is:

1. A method for operating an internal combustion engine including an engine of a motor vehicle, the method comprising the steps of:
    injecting fuel into a combustion chamber of the engine in a rich operating mode and in a lean operating mode;
    switching between said rich operating mode and said lean operating mode;
    storing nitrogen oxides in a catalytic converter and measuring lambda of the exhaust gas downstream of said catalytic converter;
    measuring a first time span (tx) after a switchover (T2) of said engine into said lean operating mode with said first time span (tx) elapsing until the measured lambda becomes lean; and,
    lengthening the time span in which said engine is in said rich operating mode or shortening the time span in which said engine is in said lean operating mode when said first time span (tx) or a value (w) dependent thereon exceeds a pregiven value (Wmax).

2. The method of claim 1, wherein: after a switchover (T2) of the engine into the lean operating mode, a second time span (tlean) is measured wherein the engine is operated lean.

3. The method of claim 1, wherein the first time span (tx) and the second time span (tlean) are coupled to each other.

4. The method of claim 1, wherein: the influencing of the engine intervenes adaptively in the control (open loop and/or closed loop).

5. A method for operating an internal combustion engine including an engine of a motor vehicle, the method comprising the steps of:
    injecting fuel into a combustion chamber of the engine in a rich operating mode and in a lean operating mode;
    switching between said rich operating mode and said lean operating mode;
    storing nitrogen oxides in a catalytic converter and measuring lambda of the exhaust gas downstream of said catalytic converter;
    measuring a first time span (tx) after a switchover (T2) of said engine into said lean operating mode with said first time span (tx) elapsing until the measured lambda becomes lean; and,
    lengthening the time span in which said engine is in said rich operating mode or shortening the time span in which said engine is in said lean operating mode when said first time span (tx) or a value (W) dependent thereon exceeds a pregiven value (Wmax); and,
    determining a value (W) which defines the ratio of the first time span (tx) to a third time span (ty) and the sum of the first time span (tx) and the third time span (ty) yields the second time span (tlean).

6. A control element, including a read-only-memory or flash memory, for a control apparatus of an internal combustion engine including an engine of a motor vehicle, the control element comprising: a program stored on said control element which can be run on a computer including a microprocessor, and said program being configured for carrying out a method including the steps of:
    injecting fuel into a combustion chamber of the engine in a rich operating mode and in a lean operating mode;
    switching between said rich operating mode and said lean operating mode;
    storing nitrogen oxides in a catalytic converter and measuring lambda of the exhaust gas downstream of said catalytic converter;
    measuring a first time span (tx) after a switchover (T2) of said engine into said lean operating mode with said first time span (tx) elapsing until the measured lambda becomes lean; and,
    lengthening the time span in which said engine is in said rich operating mode or shortening the time span in which said engine is in said lean operating mode when said first time span (tx) or a value (W) dependent thereon exceeds a pregiven value (Wmax).

7. An internal combustion engine including an engine of a motor vehicle, the engine comprising:
    a combustion chamber into which fuel is injected in a rich operating mode and in a lean operating mode;
    a catalytic converter wherein nitrogen oxides are stored during the operation of the engine;
    a control apparatus for switching the engine over between the rich operating mode and the lean operating mode;
    a lambda sensor mounted downstream of said catalytic converter for measuring the lambda of the exhaust gas;
    said control apparatus including means for measuring a first time span (tx) after a switchover into the lean operating mode with said first time span (tx) elapsing until the measured lambda becomes lean;
    lengthening the time span in which said engine is in said rich operating mode or shortening the time span in which said engine is in said lean operating mode when said first time span (tx) or a value (W) dependent thereon exceeds a pregiven value (Wmax).

8. A control apparatus for an internal combustion engine, including an engine for a motor vehicle, the internal combustion engine including a combustion chamber into which fuel is injected in a rich operating mode and in a lean operating mode, a catalytic converter in which nitrogen oxides are stored during operation of the engine, and a lambda sensor mounted downstream of the catalytic converter for measuring the lambda of the exhaust gas; the control apparatus comprising:
    means for switching over between the rich operating mode and the lean operating mode;
    means for measuring a first time span (tx) after a switchover (T2) of the internal combustion engine into the lean operating mode, said first time span (tx) elapsing or running until the measured lambda is lean; and,
    means for lengthening the time span in which said engine is in said rich operating mode or for shortening the time span in which said engine is in said lean operating mode when said first time span (tx) or a value (W) dependent thereon exceeds a pregiven value (Wmax).

* * * * *